US012664592B2

(12) United States Patent (10) Patent No.: US 12,664,592 B2
Radhakrishnan (45) Date of Patent: Jun. 23, 2026

(54) COLLABORATIVE FILTER TECHNIQUES FOR GENERATING PREDICTED RECOMMENDATIONS IN SPARSE DOMAINS

(71) Applicant: Optum, Inc., Minnetonka, MN (US)

(72) Inventor: Ramaiah Radhakrishnan, Middletown, CT (US)

(73) Assignee: Optum, Inc., Minnetonka, MN (US)

( * ) Notice: Subject to any disclaimer, the term of this patent is extended or adjusted under 35 U.S.C. 154(b) by 511 days.

(21) Appl. No.: 18/146,207

(22) Filed: Dec. 23, 2022

(65) Prior Publication Data

US 2024/0212054 A1 Jun. 27, 2024

(51) Int. Cl.
*G06Q 40/08* (2012.01)
*G06Q 30/0601* (2023.01)

(52) U.S. Cl.
CPC ......... *G06Q 40/08* (2013.01); *G06Q 30/0631* (2013.01)

(58) Field of Classification Search
CPC ........................... G06Q 40/08; G06Q 30/0631
See application file for complete search history.

(56) References Cited

U.S. PATENT DOCUMENTS 8,589,189 B2 11/2013 Celona et al.
2015/0254754 A1 9/2015 Lang et al.

2015/0370981 A1 12/2015 Nuckolls et al.
2017/0212997 A1 7/2017 Buonfiglio et al.
2019/0043606 A1 2/2019 Roots et al.
2019/0304023 A1 10/2019 Pingali et al.
2021/0075875 A1* 3/2021 Liu ................... G06F 16/24575
2021/0158451 A1 5/2021 Blazek et al.
2024/0193463 A1* 6/2024 Qin ....................... H04L 67/535

OTHER PUBLICATIONS

Adomavicius, Gedimanas et al. "Context-Aware Recommender Systems," AI Magazine, (2011), pp. 67-80.
Kamran, M. et al. "A Survey of Recommender Systems and their Application in Healthcare," University of Engineering and Technology (UET), Technical Journal, vol. 20, No. IV, Oct. 1, 2015, pp. 111-119, , Taxila, Pakistan, available online: http://tj.uettaxila.edu.pk/older-issues/2015/No.4/15.A%20Survey%20of%20Recommender%20Systems%20and%20Their%20Application%20in%20Healthcare.pdf.
Sahoo, Abhaya Kumar et al. "DeepReco: Deep Learning Based Health Recommender System Using Collaborative Filtering," Computation, vol. 7, No. 25, May 22, 2019, pp. 1-18, DOI: 10.3390/computation7020025.

* cited by examiner

*Primary Examiner* — Reginald R Reyes
(74) *Attorney, Agent, or Firm* — Alston & Bird LLP

(57) ABSTRACT

Various embodiments of the present disclosure provide methods, apparatus, systems, computing devices, computing entities, and/or the like for generating predicted recommendations by using an input entity representation, a reference entity representation, and collaborative filtering machine learning model.

20 Claims, 8 Drawing Sheets

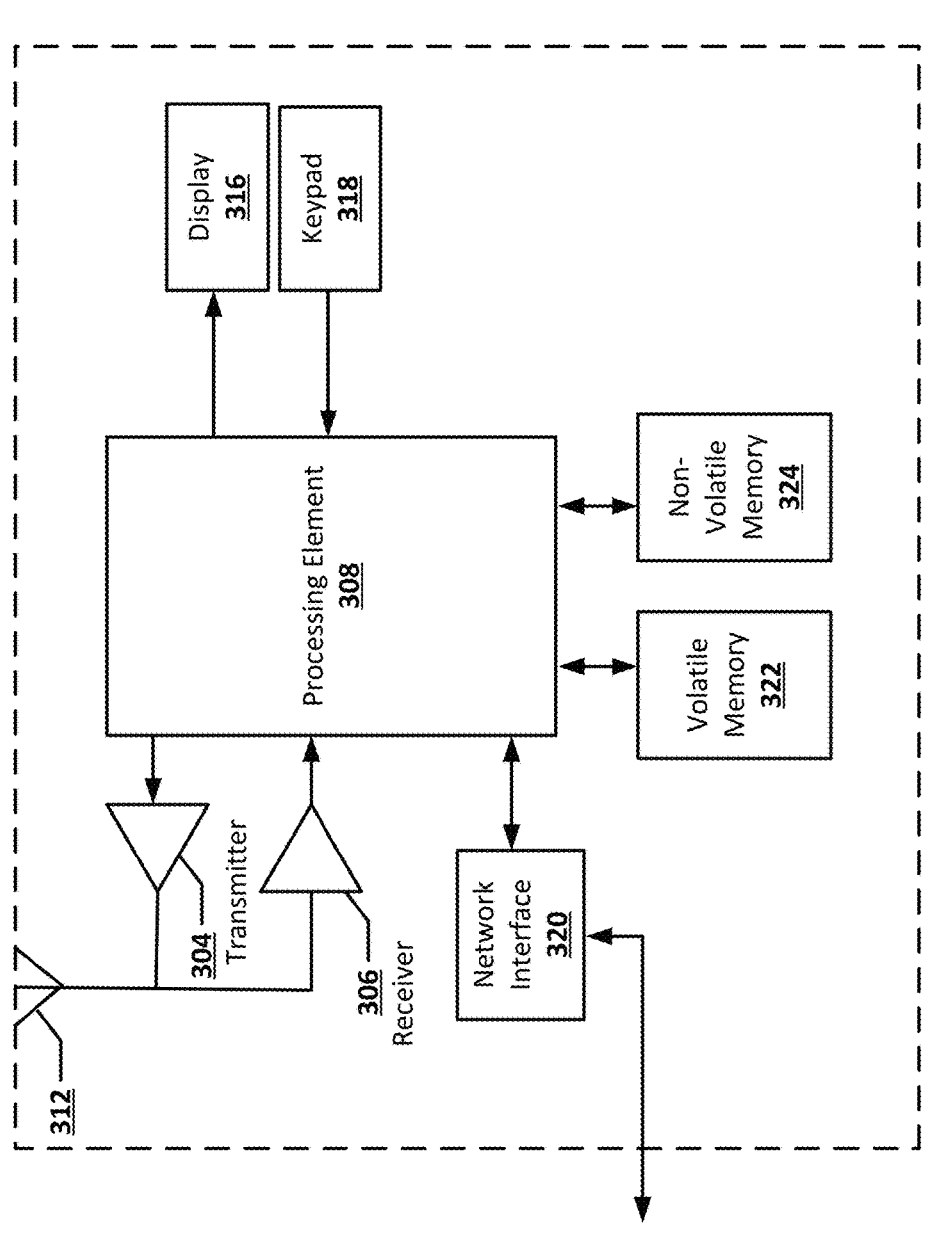
FIG. 3

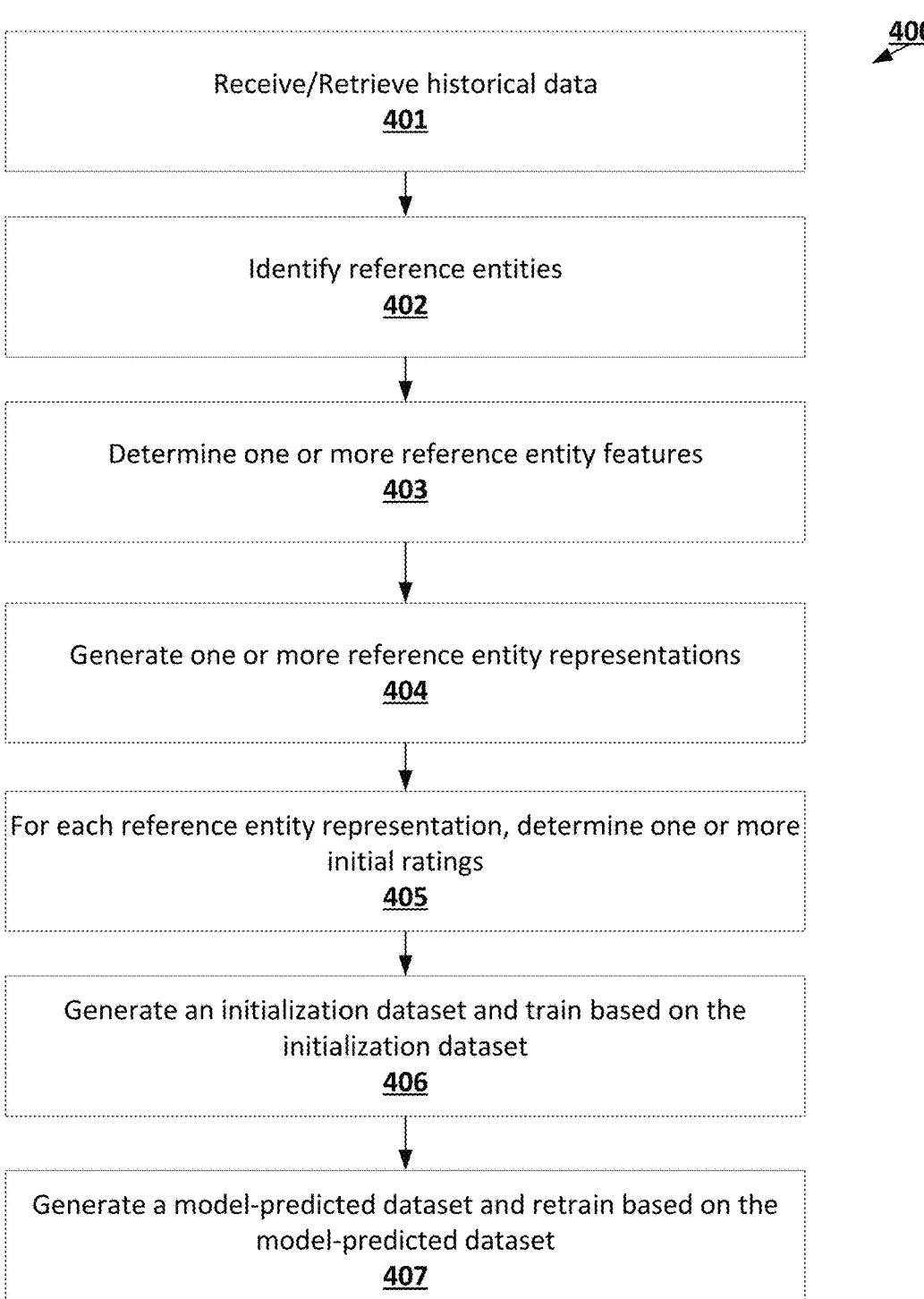

400

Receive/Retrieve historical data
401

Identify reference entities
402

Determine one or more reference entity features
403

Generate one or more reference entity representations
404

For each reference entity representation, determine one or more initial ratings
405

Generate an initialization dataset and train based on the initialization dataset
406

Generate a model-predicted dataset and retrain based on the model-predicted dataset
407

FIG. 4

500
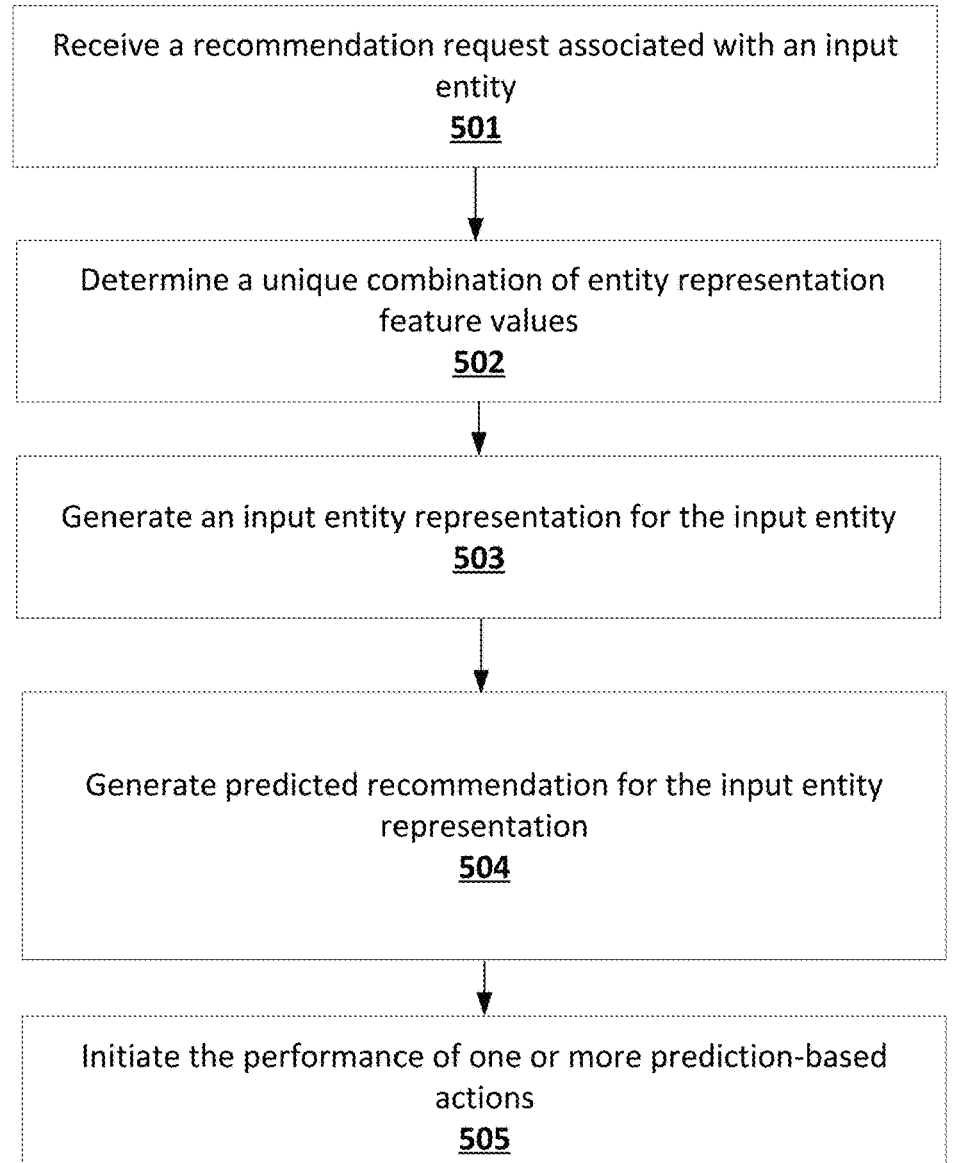
Receive a recommendation request associated with an input entity
501
Determine a unique combination of entity representation feature values
502
Generate an input entity representation for the input entity
503
Generate predicted recommendation for the input entity representation
504
Initiate the performance of one or more prediction-based actions
505
FIG. 5A

504

Determine a qualifying reference entity representation subset
504a

Determine an identifier for each reference entity representation in the qualifying reference entity representation subset
504b

Select one or more candidate from the updated entity-candidate matrix
504c

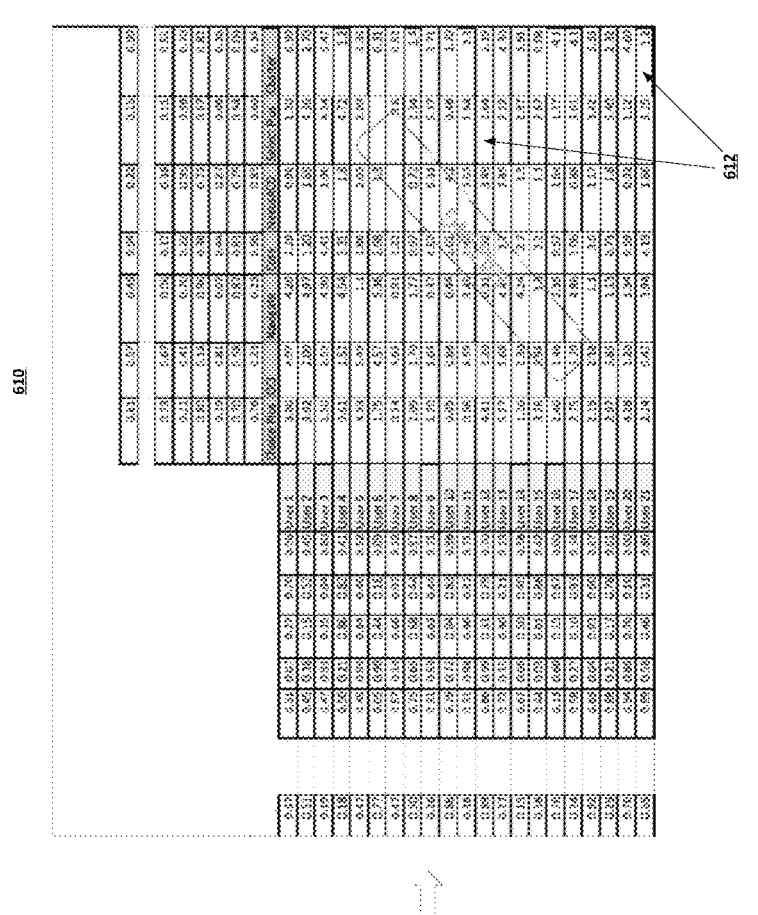
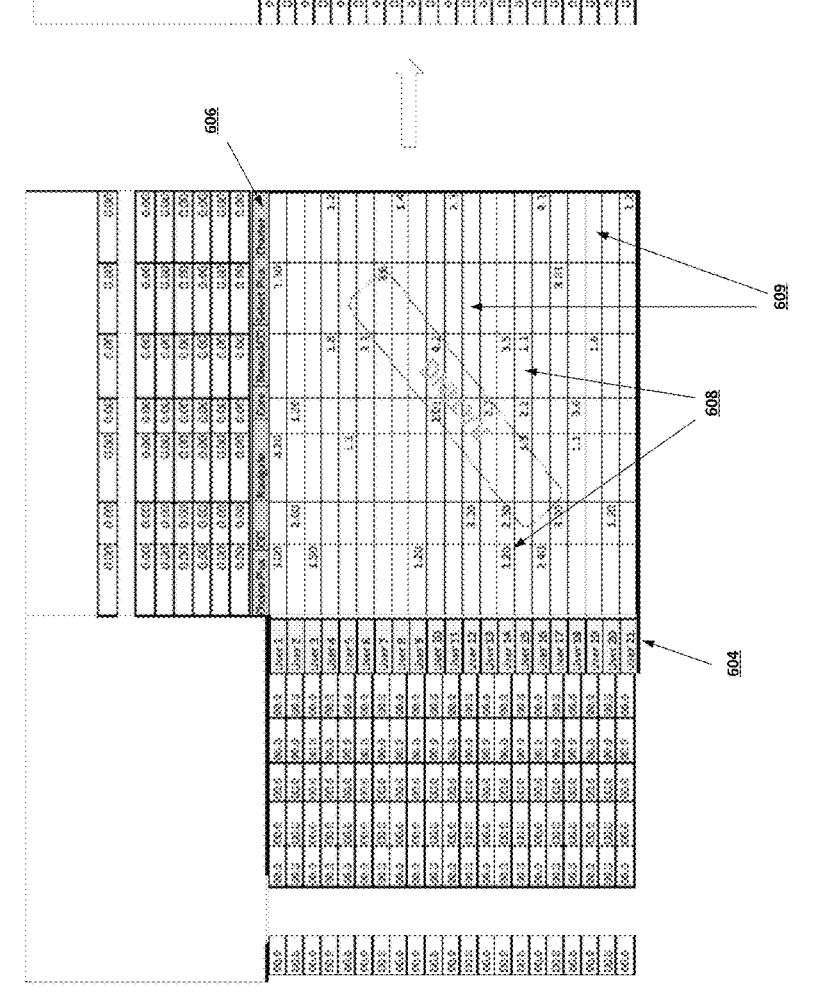
FIG. 6

COLLABORATIVE FILTER TECHNIQUES FOR GENERATING PREDICTED RECOMMENDATIONS IN SPARSE DOMAINS

BACKGROUND

Various embodiments of the present disclosure address technical challenges related to generating a predicted recommendation that overcome challenges with existing approaches for recommendations using collaborative filtering machine learning models.

BRIEF SUMMARY

In general, various embodiments of the present disclosure provide methods, apparatus, systems, computing devices, computing entities, and/or the like for generating predicted recommendations.

In accordance with one aspect, a method is provided. In one embodiment, the method comprises generating, by one or more processors, an input entity representation based at least in part on one or more entity representation features, wherein the input entity representation comprises an entity representation feature value for each entity representation feature; generating, by the processors and using a collaborative filtering machine learning model, a predicted recommendation based at least in part on the input entity representation, wherein: (i) the collaborative filtering machine learning model has been trained based at least in part on an initialization dataset, wherein (a) the initialization dataset is representative of an initial entity-candidate matrix comprising a plurality of rating data fields and (b) each rating data field is associated with a unique pair of a reference entity representation and a candidate, (ii) each data field of a first set of the plurality of rating data fields in the initial entity-candidate matrix comprises an initial rating, (iii) each data field of a second set of the plurality of rating data fields in the initial entity-candidate matrix comprises a null value, (iv) the collaborative filtering machine learning model generates a model-predicted rating for each data field of the second set, (v) a model-predicted entity-candidate matrix is generated, wherein (a) the model-predicted entity-candidate matrix comprises each initial rating and each model-predicted rating and (b) the model-predicted entity-candidate matrix is represented as a model-predicted dataset, and (vi) the collaborative filtering machine learning model has been further trained based at least in part on the model-predicted dataset; and initiating, by the processors, the performance of a prediction-based action based at least in part on the predicted recommendation.

In accordance with another aspect, a computer program product is provided. The computer program product may include a computer-readable storage medium having computer-readable program code portions stored therein, the computer-readable program code portions comprising executable portions, when executed by a processor, configured to generate an input entity representation based at least in part on one or more entity representation features, wherein the input entity representation comprises an entity representation feature value for each entity representation feature; generate, using a collaborative filtering machine learning model, a predicted recommendation based at least in part on the input entity representation, wherein: (i) the collaborative filtering machine learning model has been trained based at least in part on an initialization dataset, wherein (a) the initialization dataset is representative of an initial entity-candidate matrix comprising a plurality of rating data fields and (b) each rating data field is associated with a unique pair of a reference entity representation and a candidate, (ii) each data field of a first set of the plurality of rating data fields in the initial entity-candidate matrix comprises an initial rating, (iii) each data field of a second set of the plurality of rating data fields in the initial entity-candidate matrix comprises a null value, (iv) the collaborative filtering machine learning model generates a model-predicted rating for each data field of the second set, (v) a model-predicted entity-candidate matrix is generated, wherein (a) the model-predicted entity-candidate matrix comprises each initial rating and each model-predicted rating and (b) the model-predicted entity-candidate matrix is represented as a model-predicted dataset, and (vi) the collaborative filtering machine learning model has been further trained based at least in part on the model-predicted dataset; and initiate the performance of a prediction-based action based at least in part on the predicted recommendation.

In accordance with yet another aspect, a computing apparatus comprising a processor and memory including computer program code is provided. In one embodiment, the at least one memory and the computer program code are configured to, with the processor, cause the computing apparatus to generate an input entity representation based at least in part on one or more entity representation features, wherein the input entity representation comprises an entity representation feature value for each entity representation feature; generate, using a collaborative filtering machine learning model, a predicted recommendation based at least in part on the input entity representation, wherein: (i) the collaborative filtering machine learning model has been trained based at least in part on an initialization dataset, wherein (a) the initialization dataset is representative of an initial entity-candidate matrix comprising a plurality of rating data fields and (b) each rating data field is associated with a unique pair of a reference entity representation and a candidate, (ii) each data field of a first set of the plurality of rating data fields in the initial entity-candidate matrix comprises an initial rating, (iii) each data field of a second set of the plurality of rating data fields in the initial entity-candidate matrix comprises a null value, (iv) the collaborative filtering machine learning model generates a model-predicted rating for each data field of the second set, (v) a model-predicted entity-candidate matrix is generated, wherein (a) the model-predicted entity-candidate matrix comprises each initial rating and each model-predicted rating and (b) the model-predicted entity-candidate matrix is represented as a model-predicted dataset, and (vi) the collaborative filtering machine learning model has been further trained based at least in part on the model-predicted dataset; and initiate the performance of a prediction-based action based at least in part on the predicted recommendation.

BRIEF DESCRIPTION OF THE SEVERAL VIEWS OF THE DRAWINGS

Figure 1:
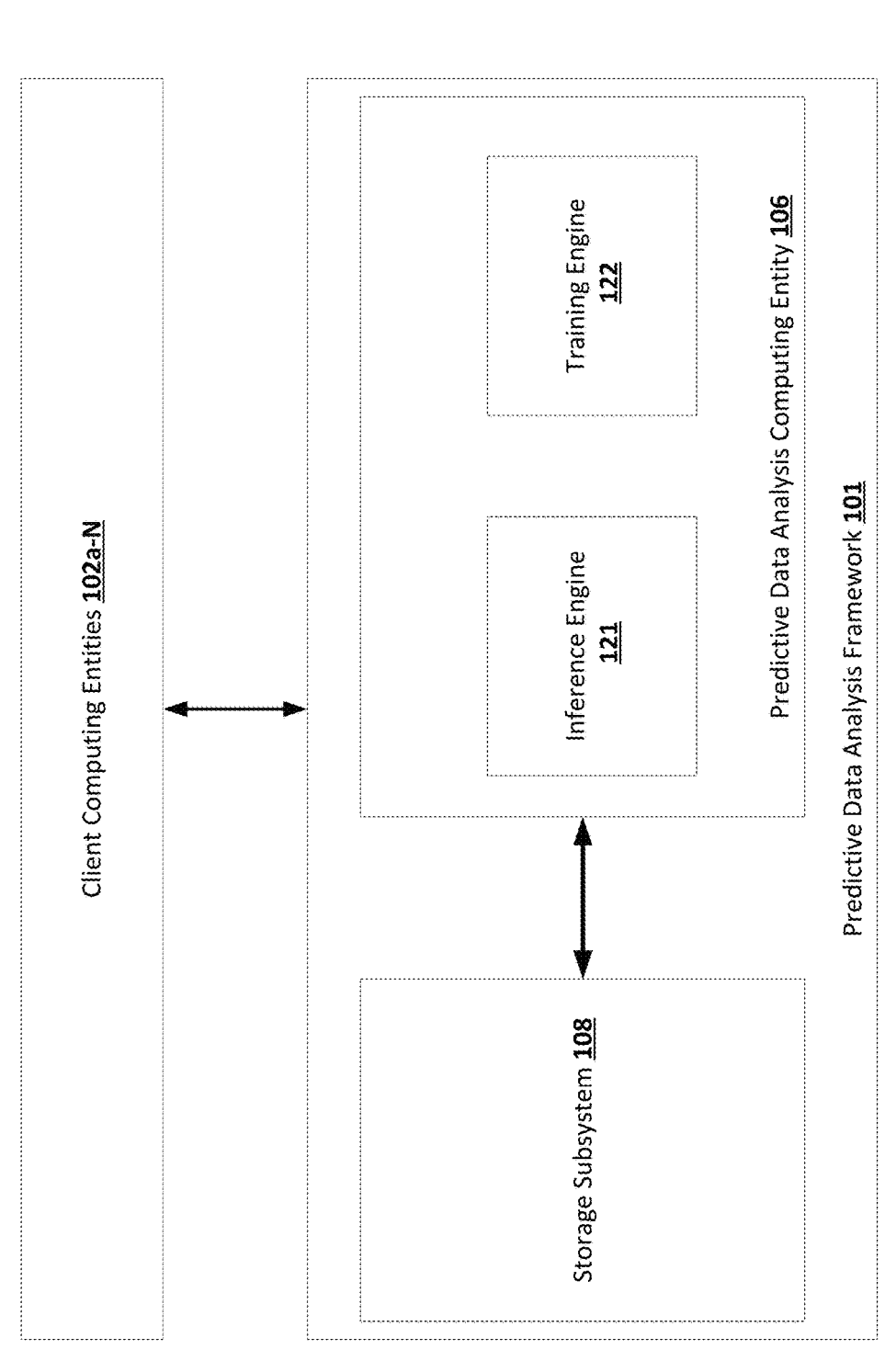

Having thus described the disclosure in general terms, reference will now be made to the accompanying drawings, which are not necessarily drawn to scale, and wherein:

FIG. 1 provides an example overview of an architecture that may be used to practice embodiments of the present disclosure.

Figure 2:
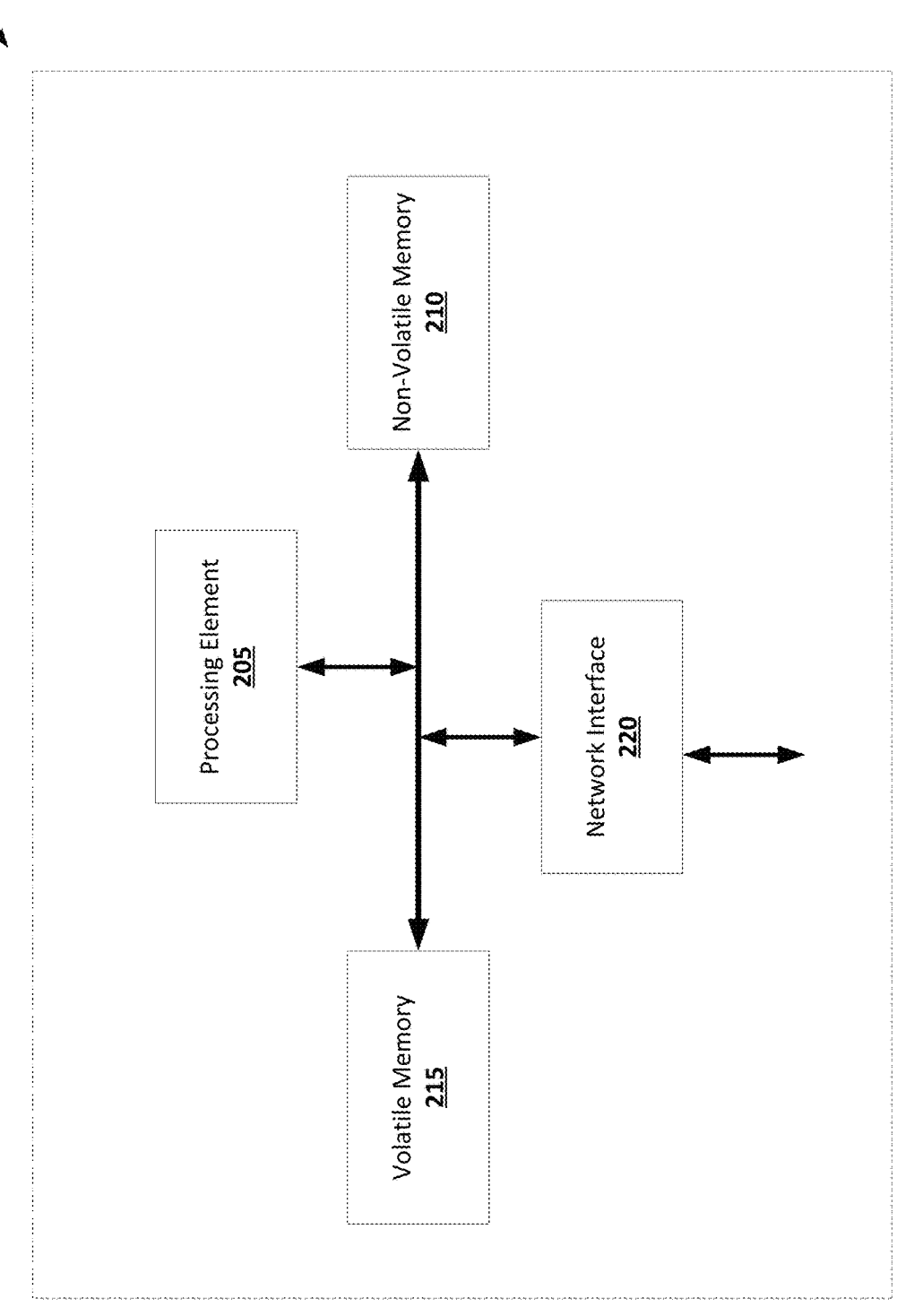

FIG. 2 provides an example predictive data analysis computing entity in accordance with some embodiments discussed herein.

FIG. 3 provides an example client computing entity in accordance with some embodiments discussed herein.

FIG. 4 is a flowchart diagram of an example process for generating a collaborative filtering machine learning model in accordance with some embodiments discussed herein.

FIG. 5A is a flowchart diagram of an example process for generating predicted recommendations in accordance with some embodiments discussed herein.

Figure 5B:

FIG. 5B is a flowchart diagram of an example process for generating a predicted recommendation using a collaborative filtering machine learning model in accordance with some embodiments discussed herein.

FIG. 6 provides an operational example for generating a collaborative filtering machine learning model in accordance with some embodiments discussed herein.

Figure 7:
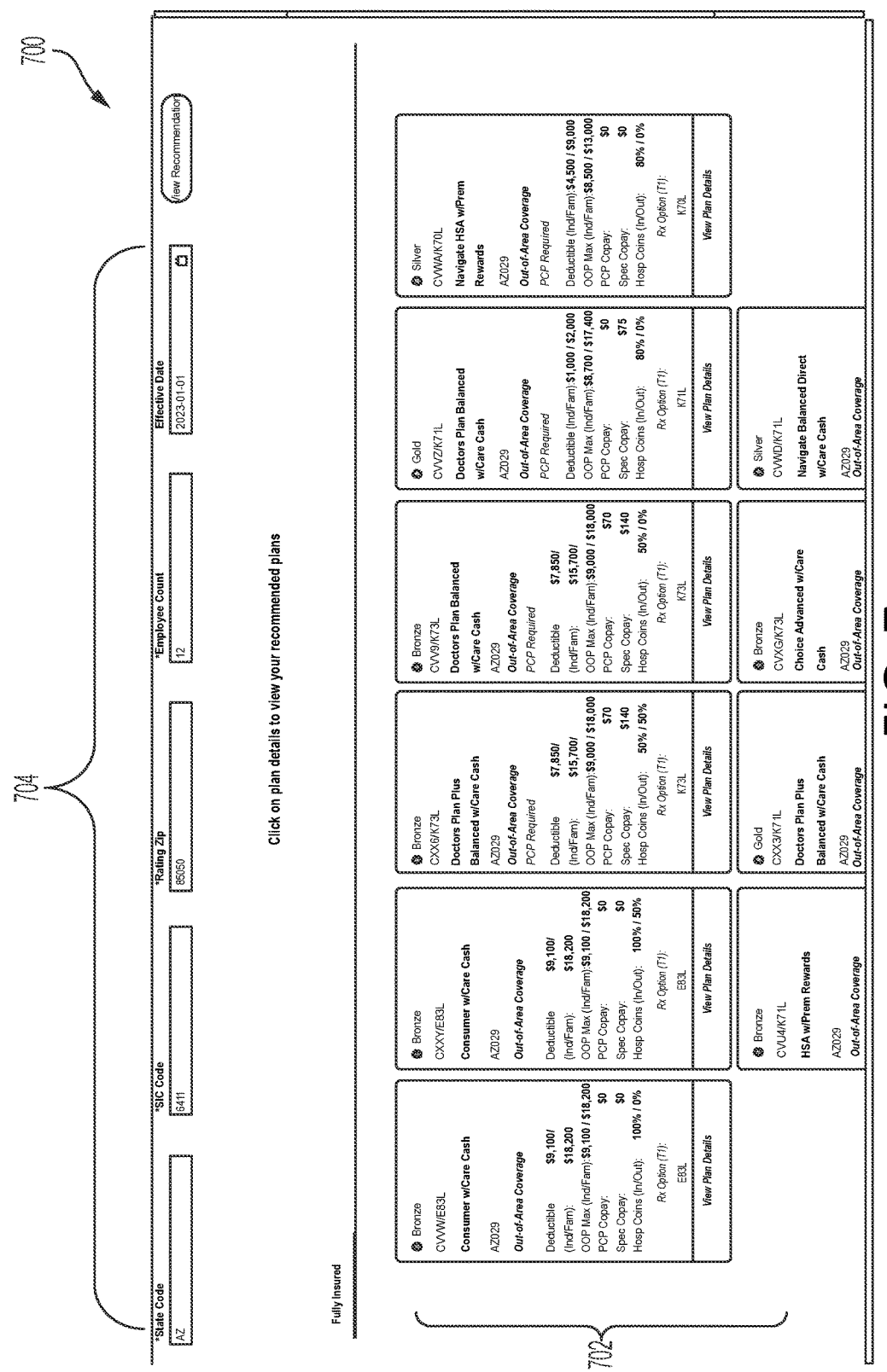

FIG. 7 provides an operational example of a recommendation user interface in accordance with some embodiments discussed herein.

DETAILED DESCRIPTION

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

I. Overview and Technical Improvements

Various embodiments of the present disclosure address technical challenges related to predictive data analysis in sparse, highly dimensional prediction domains-such as medical prediction domains for recommendations health insurance plans based on complex entity representations. In sparse, highly dimensional prediction domains, the presence of a large number of input attributes/features as well as complex relationships between those input attributes/features complicate effective and computationally efficient predictive data analysis. Moreover, the absence of sufficient data (e.g., ground-truth data) during training undermines the effectiveness of machine learning techniques for reliably and efficiently integrating complexities of input spaces into predictive models. As a result, many existing predictive data analysis solutions are ill-suited for predictive data analysis in sparse, highly dimensional prediction domains—especially when such prediction domains include complex relationships between various input fields.

In the collaborative filtering context, a first user's preferences are typically inferred based on a second user's preferences. However, traditional collaborative filtering techniques require "user" and "rating" inputs. Thus, traditional collaborative filtering techniques are generally incompatible with other implementations, such as the healthcare domain, where "users" and "ratings" are challenging to define and represent. For example, determining what constitutes a "user" may be difficult to define for health insurance plan recommendations where many entities may exist in complex relationships. As another example, unlike items, such as commercial goods, determining a user's health insurance plan preference/rating may be especially difficult given that employers do not readily make their preferences for health insurance plans known or easily accessible. To overcome these technical challenges, embodiments of the present disclosure innovatively generate (i) entity representations and (ii) rating features for candidates in a manner that facilitates predictive data analysis in sparse, highly dimensional input spaces. In one example, this approach is particularly beneficial in the health insurance recommendation input space where recommending health insurance plans for employer groups is generally a complex task (e.g., because of the complexities of healthcare products). Accordingly, various embodiments of the present disclosure enable collaborative filtering machine learning models to be employed in generating prediction recommendations in the health insurance plan recommendation space. To that end, various embodiments of the present disclosure improve the reliability of predictive data analysis.

In some embodiments, a collaborative filtering machine learning model generates model-predicted ratings from initial ratings when data is sparse. With the model-predicted data, the collaborative filtering machine learning model may be further trained for more accurate predictions. Additionally, each entity (e.g., input entity or reference entity) can be represented as a combination of relevant feature values to identify similar entities. When a reference entity is determined to be similar, the model-predicted ratings and initial ratings can be used to provide a predicted recommendation for the input entity.

Moreover, various embodiments of the present disclosure enable techniques for training/generating collaborative filtering machine learning models that reduce the need for computationally resource-intensive operations during training/generating of the models. For example, training data can be transformed or represented in a manner that enables less resource-intensive operations. For instance, by representing users as a combination of relevant feature values, various embodiments of the present disclosure are able to employ computationally efficient similarity measures to cluster users. This in turn allows for more efficient training. Accordingly, by improving efficiency of training, various embodiments of the present disclosure improve the overall efficiency of predictive data analysis frameworks that utilize such models. Moreover, improving efficiency of training collaborative filtering machine learning models makes retraining more efficient. Thus, various embodiments of the present disclosure increase computational efficiency, accuracy, and reliability of various existing predictive data analysis systems, especially predictive data analysis systems configured to preform prediction recommendations in sparse and highly dimensional domains.

The term "input entity representation" may refer to a data construct that describes an input entity, such as a real-world entity and/or a virtual entity (e.g., an employer). An input entity representation may be a combination of reference entity feature values for selected entity representation features. For example, an input entity representation may represent an entity/user (e.g., organizations, businesses, computing server computing entities, and/or the like) associated with one or more features of computing systems, employer/employee groups (e.g., organizations, businesses, and/or the like), and/or the like.

The term "reference entity representation" may refer to a data construct that describes a reference entity, such as a real-world entity and/or a virtual entity (e.g., employers). A reference entity representation may be a combination of reference entity feature values for selected entity representation features. A reference entity representation may be associated with rating features corresponding to ratings of one or more candidates.

The term "entity representation feature" may refer to features of data associated with an entity representation (e.g., input entity representation, reference entity representation). In some embodiments, a given entity representation feature, alone or in combination with one or more other entity representation features may be used to define or otherwise represent an entity (an entity representation). For example, a given entity may be represented/defined based on a combination of one or more entity representation feature values for selected one or more entity representation features. In some embodiments, the combination of entity representation features may be determined to be an optimal combination of entity representation features for defining/representing an entity.

The term "combination of entity representation feature values" may refer to a data construct that describes for a given entity, the values for each entity representation feature of the entity representation features.

The term "entity representation" may refer to a data object associated with an entity and that comprises a combination of entity representation feature values. This is a general term to refer to either the input entity representation or the reference entity representation.

The term "similarity measure" may refer to a measure of similarity between two entity representations. For example, a similarity measure may be used to determine the similarity of an input entity representation and each reference entity representation.

The term "qualifying reference entity representation subset" may refer to a data construct that describes one or more reference entities that are determined to be similar to an input entity representation based on a measure of similarity, such as a similarity measure between the input entity representation and the one or more reference entity representations. For example, a particular reference entity representation may be determined to be similar to a particular input entity representation based on a measure of similarity, such as a similarity measure between the particular reference entity representation and the particular input entity representation that satisfies a similarity threshold (e.g., exact match, partial match, being within a specified distance, and/or the like). In some embodiments, a plurality of reference entity representation clusters may be determined based on a plurality of reference entity representations, where each reference entity representation cluster comprises a subset of the plurality of reference entity representations determined to be similar (e.g., based on similarity measures between pairs of reference entity representations). In some embodiments, a qualifying reference entity representation subset for an input entity representation may be determined based on determining/identifying a reference entity representation cluster of the plurality of reference entity representation clusters that is most similar to the input entity representation The term "collaborative filtering machine learning model" may refer to a data construct that describes parameters, hyperparameters and/or defined operations of a machine learning model. The collaborative filtering machine learning model may be configured to generate predicted recommendations based on input entity. Generally, a collaborative filtering machine learning model uses relationship between users (e.g., entities) and items (e.g., candidates) to predict ratings for user-item pairs not associated with a rating. To do so, collaborative filtering machine learning models may perform approximate factorization on an initialization dataset (e.g., represented as a user-item matrix) to generate two matrices-a user matrix and an item matrix. The user matrix may comprise values for a set of latent features for each user. The item matrix may comprise values for a set of latent features for each item. Collaborative filtering machine learning models can learn these latent features based on patterns in the initialization dataset. Further, collaborative filtering machine learning models can generate values for these latent features, such that they match/correspond as closely as possible to the existing ratings in the user-item matrix (e.g., initial entity-candidate matrix). For example, the collaborative filtering machine learning model may predict the values such that for a user-item pair in the initializing dataset that is associated with a rating, the dot product of the corresponding set of features for the user and the item is as close as possible to the rating.

The term "candidate" may refer to an item, resource, and/or the like that may be recommended to an input entity. For example, a collaborative filtering machine learning model may be configured to recommend one or more candidates to an input entity based on the input entity representation for the input entity. In some embodiments, a candidate may include an identifier associated with the item, resource, and/or the like that may be recommended to input entities. For example, a candidate may include an item identifier associated with a particular item that may be recommended to an input entity. As another example, a candidate may include a resource identifier associated with a particular resource that may be recommended to an input entity.

The term "rating feature" may refer to an entity representation that describes one or more data elements associated with an entity. In some embodiments, a reference entity representation may be associated with rating features that include: (i) descriptive features, such as an enrolled members count that describes the number of members (e.g., employees) of an employer reference entity associated with a particular health insurance plan (e.g., the number of employees of an employer reference entity that are enrolled under a particular health insurance plan offered/purchased by the employer reference entity); and (ii) a relationship length element that describes, for example, the length of time a reference entity has been associated with the health insurance provider that provides the noted health insurance plans.

The term "initial rating" may refer to a rating feature, a rating score, and/or similar words used herein interchangeably that represent determined, identified, or derived values that correspond to an entity and candidate pair. Initial ratings represent an entity's determined, identified, or derived preference for the corresponding candidate.

The term "model-predicted rating" may refer to a rating feature, a rating score, and/or similar words used herein interchangeably that represent predicted values that correspond to an entity and candidate pair. Model-predicted ratings represent an entity's predicted preference for the corresponding candidate.

The term "initialization dataset" may refer to a data entity representation that describes data used by a machine learning model to generate a model-predicted dataset. In some embodiments, an initialization dataset may comprise, for each reference entity representation, one or more initial ratings. The initialization dataset may be an initial training dataset.

The term "model-predicted dataset" may refer to a data entity representation that describes data that is associated with a collaborative filtering machine learning model and/or generated by a collaborative filtering machine learning model. In some embodiments, the model-predicted dataset may include data that includes, for each reference entity representation, one or more rating features, where predicted recommendations may be generated for input entities based on the corresponding input entity representations and rating features associated with a qualifying reference entity representation subset.

The terms "predicted recommendation" or "predicted recommendation data object" may refer to a prediction of one or more candidates. For example, a predicted recommendation may represent, describe, and/or comprise one or more candidates-such as computing resource identifiers, health plan identifiers, and/or the like.

The term "document data object" may refer to a data object that describes a collection of data items, such as a collection of text data items, a collection of image data items, and/or the like. Examples of document objects include Portable Document Format (PDF) files, Hyper-Text Markup Language (HTML) source files, Microsoft Word documents, image files, and/or the like. Examples of document data objects may include contracts (e.g., contract between two parties), agreements (e.g., service agreements), and/or the like.

II. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Example System Architecture

FIG. 1 is a schematic diagram of an example architecture 100 for performing predictive data analysis. The architecture 100 includes a predictive data analysis framework 101 configured to receive predictive data analysis requests (e.g., recommendation requests) from client computing entities 102a-N, process the predictive data analysis requests to generate predictions, provide the generated predictions to the client computing entities 102a-N, and automatically perform prediction-based actions based on the generated predictions.

In some embodiments, the predictive data analysis framework 101 may communicate with at least one of the client computing entities 102a-N using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (e.g., network routers, and/or the like).

The predictive data analysis framework 101 may include a predictive data analysis computing entity 106 and a storage subsystem 108. The predictive data analysis computing entity 106 may be configured to receive predictive data analysis requests from one or more client computing entities 102a-N, process the predictive data analysis requests to generate predictions corresponding to the predictive data analysis requests, provide the generated predictions to the client computing entities 102a-N, and automatically perform prediction-based actions based on the generated predictions.

The predictive data analysis computing entity 106 may include a training engine 122 configured to generate trained machine learning models, such as a collaborative filtering machine learning model. The predictive data analysis computing entity 106 may further include an inference engine 121 configured to generate predicted recommendations using the collaborative filtering machine learning model. The inference engine 121 of the predictive data analysis computing entity 106 may be further configured to perform prediction-based actions based on the generated predicted recommendations.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Example Predictive Data Analysis Computing Entity

FIG. 2 provides a schematic of a predictive data analysis computing entity 106 according to one embodiment of the present disclosure. In general, the terms client computing entity, computer, entity representation, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entity representations, set-top boxes, relays, routers, network access points, base stations, the like, and/or any combination of devices or entity representations adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that may be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entity representations, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity representation-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 702.11 (Wi-Fi), Wi-Fi Direct, 702.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Example Client Computing Entity

FIG. 3 provides an illustrative schematic representative of client computing entities 102a-N that may be used in conjunction with embodiments of the present disclosure. In general, the terms device, system, client computing entity, entity representation, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entity representations, set-top boxes, relays, routers, network access points, base stations, the like, and/or any combination of devices or entity representations adapted to perform the functions, operations, and/or processes described herein. Client computing entities 102a-N may be operated by various parties. As shown in FIG. 3, the client computing entities 102a-N can include an antenna 312, a transmitter 304 (e.g., radio), a receiver 306 (e.g., radio), and a processing element 308 (e.g., CPLDs, microprocessors, multi-core processors, coprocessing entity representations, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entities 102a-N may be capable of operating with one or more air interface standards, communication protocols, modulation types, and access types. More particularly, the client computing entities 102a-N may operate in accordance with any of a number of wireless communication standards and protocols, such as those described above with regard to the predictive data analysis computing entity 106. In a particular embodiment, the client computing entities 102a-N may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entities 102a-N may operate in accordance with multiple wired communication standards and protocols, such as those described above with regard to the predictive data analysis computing entity 106 via a network interface 320.

Via these communication standards and protocols, the client computing entities 102a-N can communicate with various other entity representations using concepts such as Unstructured Supplementary Service Data (USSD), Short Message Service (SMS), Multimedia Messaging Service (MMS), Dual-Tone Multi-Frequency Signaling (DTMF), and/or Subscriber Identity representation Module Dialer (SIM dialer). The client computing entities 102a-N can also download changes, add-ons, and updates, for instance, to its firmware, software (e.g., including executable instructions, applications, program modules), and operating system.

According to one embodiment, the client computing entities 102a-N may include location determining aspects, devices, modules, functionalities, and/or similar words used herein interchangeably. For example, the client computing entities 102a-N may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entities 102a-N in connection with a variety of other systems, including cellular towers, Wi-Fi access points, and/or the like. Similarly, the client computing entities 102a-N may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entities 102a-N may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entities 102a-N to interact with and/or cause display of information/data from the predictive data analysis computing entity 106, as described herein. The user input interface can comprise any of a number of devices or interfaces allowing the client computing entities 102a-N to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entities 102a-N and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entities 102a-N can also include volatile storage or memory 322 and/or non-volatile storage or memory 324, which may be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entities 102a-N. As indicated, this may include a user application that is resident on the entity representation or accessible through a browser or other user interface for communicating with the predictive data analysis computing entity 106 and/or various other computing entities.

In another embodiment, the client computing entities 102*a*-N may include one or more components or functionality that are the same or similar to those of the predictive data analysis computing entity 106, as described in greater detail above. As will be recognized, these architectures and descriptions are provided for example purposes only and are not limiting to the various embodiments.

IV. Example System Operations

Various embodiments of the present disclosure address technical challenges related to predictive data analysis in sparse, highly dimensional prediction domains.

FIG. 4 depicts an example process 400 for generating a collaborative filtering machine learning model configured to generate predicted recommendations for input entities. A collaborative filtering machine learning model may refer to a data construct that describes parameters, hyperparameters, and/or defined operations of a machine learning model. The collaborative filtering machine learning model may be configured to generate predicted recommendations for input entities based on rating associated with reference entity representations from a qualifying reference entity representation subset. The ratings may include one or more initial ratings and one or more model-predicted ratings.

In some embodiments, the process 400 begins at step/operation 401 when the predictive data analysis computing entity 106 receives or retrieves historical data associated with a plurality of reference entities. In some embodiments, the historical data may originate from one or more data sources. For example, in the health insurance plan recommendation context, the predictive data analysis computing entity 106 receives or retrieves data associated with small business Affordable Care Act (ACA) customers from one or more data sources, such as United States Pharmacopeia (USP), PRIME, UHOP/SAFES platforms that manage small business ACA customers.

In some embodiments, the historical data may be extracted from one or more document data objects. For example, a document data object may be associated with a reference entity. In the health insurance plan recommendation context, the one or more document data objects may include health insurance contracts, agreements, and/or the like among health insurance providers and employers.

At step/operation 402, the predictive data analysis computing entity 106 determines, identifies, and similar words used herein interchangeably, reference entities based on the historical data. In the health insurance plan recommendation context, the predictive data analysis computing entity 106 may extract data that includes identifiers for health insurance providers (e.g., computing resource identifiers, health plan identifiers, and/or the like).

In some embodiments, the predictive data analysis computing entity 106 may also standardize the data received from the various data sources. Then, at step/operation 403, the predictive data analysis computing entity 106 may determine, identify, and/or similar words used herein interchangeably, the reference entity features that comprise an optimal combination of reference entity features. To determine the optimal reference entity features, an iterative process may be used. The optimal reference entity features are the combination of reference entity features that provides optimal predicted recommendation results using the collaborative filtering machine learning model. The combination that provides the optimal results may also uniquely identify each reference entity. In the health insurance plan recommendation context, the optimal reference entity features may include a combination of at least two of an industry code (e.g., sic code), a rating area, a first geographic identifier (e.g., state code), a first geographic identifier (e.g., county code), or employer size grouping. The employer size grouping may be defined by the number of employees associated with the employer entity representation (e.g., 5< employees, 5-10 employees, 10-20 employees, 20-30 employees, 30-50 employees, $\geq$50 employees, and/or the like). As will be recognized, depending on the context, any features and number of features may be used to adapt to various needs and circumstances.

In some embodiments, other data features may also be determined/identified based on the standardized data. In the health insurance plan recommendation context, the other data features may include health insurance plans, health insurance plan categories, and/or the like.

In some embodiments, at step/operation 404, the predictive data analysis computing entity 106 generates a reference entity representation for each reference entity based on the corresponding reference entity features and their respective values. Each reference entity representation includes entity representation feature values that correspond to the entity representation features. As indicated, in the health insurance plan recommendation context, the entity representation features include an industry code, a rating area, and an employer size grouping. For instance, the entity representation features may include a combination of entity representation feature values: {industry code: 124, rating area: A, employer size grouping: 10-20}. Similarly, the entity representation features may include the entity representation features values: {industry code: 128, rating area: A, employer size grouping: 5-10}. As yet another example, the entity representation features may include the entity representation features values: {industry code: 347, rating area: C, employer size grouping: 20-30}. The reference entity representations may further be represented as embeddings.

At step/operation 405, the predictive data analysis computing entity 106 determines, identifies, and/or similar words used herein interchangeably, a set of rating features. For example, in the health insurance plan recommendation context, rating features may include: (i) an enrolled members count that describes the number of members (e.g., employees) of a reference entity representation that are associated with a particular candidate (e.g., the number of employees of an employer reference entity representation that are enrolled under a particular health insurance plan offered/purchased by the employer reference entity representation); and (ii) a relationship length feature that describes, for example, the length of time a reference entity representation has been associated with a health insurance provider.

In some embodiments, the predictive data analysis computing entity 106 then determines initial ratings based on the rating features. In one example, the initial ratings are based on equally weighted ratings features. In another example, the weight of the rating features may vary. In the health insurance plan recommendation context, the initial ratings may be determined based on equally weighted (i) number of years the employer has been associated with the health insurance provider from the initial effective date and (ii) enrolled members counts to the health insurance plans. In this regard, the rating feature that describes the number of years an existing employer group has been associated with the health insurance provider may indirectly provide an indication as to whether an employer group prefers the plan. Each initial rating indicates the likelihood that the entity prefers the corresponding candidate. In some embodiments, the predictive data analysis computing entity 106 may normalize the initial ratings. For example, the initial ratings may be normalized to be within a certain domain (e.g., [0, 5], [1, 8] and/or the like).

At step/operation 406, the predictive data analysis computing entity 106 generates an initialization dataset based on the initial ratings. For example, the initialization dataset comprises, for each reference entity (e.g., from a qualifying reference entity representation subset), one or more initial ratings. In some embodiments, the initialization dataset may be represented as a matrix, such as an initial entity-candidate matrix. The initial entity-candidate matrix may include a plurality of rating data fields and a plurality of reference entity fields. Each of the plurality of rating data fields may represent an initial rating associated with a respective candidate. Each of the plurality of reference entity fields may be associated with a given reference entity from qualifying reference entity representation subset. In one embodiment, each rating data field may be associated with a unique pair of a reference entity representation and a candidate. In some embodiments, the initial entity-candidate matrix may comprise a first set of the plurality of rating data fields and a second set of the plurality of rating data fields. Each data field of the first set of the plurality of rating data fields may comprise an initial rating and each data field of the second set of the plurality of rating data fields may comprise an empty/null value. An empty/null value may comprise a rating data field for which no initial rating exists for a given candidate in association with a given reference entity. In some embodiments, a collaborative filtering machine learning model may generate model-predicted ratings for the rating data fields with null/empty values, as described in further detail below.

In some embodiments, the training engine 122 trains the collaborative filtering machine learning model based on the initialization dataset. Training the collaborative filtering machine learning model may include generating embeddings from the initialization dataset. For example, the training engine 122 may generate or use a reference entity representation embedding for each reference entity representation, a candidate embedding for each candidate, and/or combinations thereof from the initial entity-candidate matrix data object. In some embodiments, the reference entity representation embeddings may be generated based on predicted values for one or more latent features for the reference entity representations. Further, the candidate embeddings may be generated based on predicted values for one or more latent features for the candidates. For example, in some embodiments, generating the reference entity representation embeddings and the candidate embeddings may include learning/identifying the one or more latent features for the reference entity representations and the one or more latent features for the candidates based on the initializing dataset (e.g., based on patterns in the dataset). Further, generating the embeddings may comprise predicting the values for the respective one or more latent features for each entity representation and each candidate such that they correspond as closely as possible to the initial ratings in the initializing dataset. For example, in some embodiments, the initial rating of a reference entity and candidate pair may correspond to the dot product of the one or more latent feature values for the reference entity and the one or more latent feature values for the candidate. In some embodiments, the collaborative filtering machine learning model is trained based on the initialization dataset until a loss function/ratio for the collaborative filtering machine learning model is trending in a downward slope.

FIG. 6 depicts an initialization dataset (element 602 of FIG. 6). In some embodiments, the initial entity-candidate matrix may include rating data fields with initial ratings and rating data fields with null/empty values. The initialization dataset includes reference entities (elements 604) and candidates (elements 606), where each reference entity is associated with one or more initial ratings (elements 608). As will be recognized from the initialization dataset, there are rating data fields with null/empty values (elements 609) in the initial entity-candidate matrix data object. To increase the accuracy of the predictions with sparse data from the initial entity-candidate matrix, the collaborative filtering machine learning model may further generate model-predicted ratings for the null/empty values in the initial entity-candidate matrix. To do so, as described above, the collaborative filtering machine learning model may generate embeddings for the reference entities (based on the reference entity representations) and candidates associated with the rating data fields with null/empty values. For example, the collaborative filtering machine learning model may generate an embedding (e.g., reference entity representation embedding) for each reference entity representation and an embedding (e.g., candidate embedding) for each candidate.

In some embodiments, at step/operation 407, the collaborative filtering machine learning model generates model-predicted ratings for the rating data fields with null/empty values. For example, the collaborative filtering machine learning model may generate a model-predicted rating for each data field of the second set in the initial entity-candidate matrix that comprises null/empty values. The model-predicted ratings are then merged with the initial ratings from the initial entity-candidate matrix to generate a model-predicted entity-candidate matrix. For example, the collaborative filtering machine learning model may generate a model-predicted dataset comprising a model-predicted entity-candidate matrix with a plurality of rating data fields (comprising initial ratings and model-predicted ratings). In some embodiments, for each unique pair of a reference entity representation and a candidate, the corresponding model-predicted rating in the model-predicted entity-candidate matrix is generated based on a reference entity representation embedding for the reference entity representation and a candidate embedding for the candidate. The model-predicted entity-candidate matrix may be represented as a model-predicted entity-candidate matrix data object. The model-predicted entity-candidate matrix comprises both initial ratings and model-predicted ratings. For example, each data field of the first set in the initial entity-candidate matrix comprises the initial rating in the model-predicted entity-candidate matrix and each data field of the second set in the initial entity-candidate matrix comprises a model-predicted rating in the model-predicted entity-candidate matrix. FIG. 6 depicts a model-predicted dataset (element 610 of FIG. 6) represented as a model-predicted entity-candidate matrix data object. As can be seen from FIG. 6, the model-predicted dataset (element 610 of FIG. 6) includes model-predicted ratings (elements 612) for the one or more rating data fields with null/empty values in the initial entity-candidate matrix (e.g., the initialization dataset).

The collaborative filtering machine learning model may then be retrained, further trained, fitted, and/or similar words used herein interchangeably based on the model-predicted entity-candidate matrix data object. For example, the training engine 122 may generate a reference entity representation embedding for each reference entity representation, a candidate embedding for each candidate, and/or combinations thereof from the model-predicted entity-candidate matrix data object. In some embodiments, the collaborative filtering machine learning model is retrained based on the model-predicted entity-candidate matrix until a loss function/ratio for the collaborative filtering machine learning model is trending in a downward slope. With the collaborative filtering machine learning model further trained based at least in part on the model-predicted dataset, the collaborative filtering machine learning model may be used to generate predicted recommendations for input entities based on their input entity representations.

In some embodiments, an initial entity-candidate matrix and a corresponding model-predicted entity-candidate matrix may be associated with a particular entity type. For example, in the health insurance plan recommendation context, a first initial entity-candidate matrix and corresponding model-predicted entity-candidate matrix may be associated with ACA employers, while a second initial entity-candidate matrix and corresponding model-predicted entity-candidate matrix may be associated with non-ACA employers. As will be recognized, depending on the context, numerous entity candidate matrices (e.g., initial entity-candidate matrix and corresponding model-predicted entity-candidate matrix) may be generated and used to adapt to various needs and circumstances.

In some embodiments, the process 500 begins at step/operation 501 of FIG. 5A in which the predictive data analysis computing entity 106 receives a recommendation request. The recommendation may originate from various entities, such as any of client computing entities 102a-N. In the health insurance plan recommendation context, a recommendation request may be a request to recommend candidate health insurance plans originating from a client computing entity 102a.

In some embodiments, at step/operation 502 of FIG. 5A, the collaborative filtering machine learning model identifies/determines entity representation feature values for selected entity representation features. As has been described, an input entity representation is a depiction of a real-world entity and/or a virtual entity. An input entity representation may represent an organization, business, computing server computing entity, and/or the like. Such real-world entities and/or virtual entities may be associated with one or more attributes or features. For example, in the health insurance plan recommendation context, an input entity representation may include entity representation feature values, such as an industry code value for the input entity, the rating area value for the input entity, and the employer size grouping value for the input entity. The combination of specific entity representation feature values for selected entity representation features may include a combination of entity representation features determined to be optimal for generating predicted recommendations.

In some embodiments, at step/operation 503 of FIG. 5A, the collaborative filtering machine learning model generates an input entity representation for the input entity based on the combination of entity representation feature values. The predictive data analysis computing entity 106 may use the input entity representation to identify similar entity representations (e.g., reference entity representations).

In some embodiments, at step/operation 504 of FIG. 5A, the collaborative filtering machine learning model generates a predicted recommendation for the input entity representation. To do so, the collaborative filtering machine learning model determines, using the collaborative filtering machine learning model, the reference entity representations that are similar (e.g., or most similar) to the input entity representation.

In some embodiments, step/operation 504 of FIG. 5A includes step/operation 504a of FIG. 5B. In step/operation 504a of FIG. 5B, the collaborative filtering machine learning model determines, identifies, and similar words used herein interchangeably a qualifying reference entity representation subset from the reference entity representations. As will be recognized, each reference entity representation is represented in both the initial entity-candidate matrix and the model-predicted entity-candidate matrix. The qualifying entity representation subset for an input entity representation includes one or more reference entity representations that are determined to be similar to the input entity using a similarity measure. The term similarity measure may refer to a measure of similarity between two entity representations. The similarity threshold may define criteria for being considered similar, such as an exact match, a partial match, or being with a specified distance. Further, a similarity threshold may need to be satisfied for two entity representations to be similar.

In an example in which the similarity threshold requires an exact match, all entity representation features for the input entity representation and the reference entity representation must be the same. In an example in which the similarity threshold requires a partial match, a specified minimum of entity representation features for the input entity representation and the reference entity representation must be the same. For example, a specified minimum (r the similarity threshold) of entity representation features for the reference entity representation and input entity representation must be determined to be an exact match. For example, consider where each entity representation comprises four entity representation features, $r=2$, the entity representation feature values for the first pair of corresponding entity representation features match, the entity representation feature values for the second pair of corresponding entity representation features do not match, the entity representation feature values for the third pair of corresponding entity representation features do not match, and the entity representation feature values for the fourth pair of corresponding entity representation features match, then the pair of entity representations may be determined to be similar. As another example, consider where each entity representation comprises four entity representation features, $r=3$, the entity representation feature values for the first pair of corresponding entity representation features match, the entity representation feature values for the second pair of corresponding entity representation features do not match, the entity representation feature values for the third pair of corresponding entity representation features do not match, and the entity representation feature values for the fourth pair of corresponding entity representation features do not match, then the pair of entity representations may be determined to be non-similar. And yet as another example, the similarity measure may require that the distance between the two entity representations be within a specified distance.

In some embodiments, at step/operation 504b of FIG. 5B, the predictive data analysis computing entity 106 determines, identifies, and similar words used herein interchangeably a reference entity identifier for each reference entity in qualifying reference entity representation subset.

In some embodiments, at step/operation 504c of FIG. 5B, the predictive data analysis computing entity 106 can use the respective identifiers, or representations thereof, to access the corresponding candidates and their respective ratings for each reference entity in qualifying reference entity representation subset. For example, if the input entity representation was determined to be similar to three reference entities, such as User 2, User 11, and User 19, the predictive data analysis computing entity 106 can access or query the candidate from the model-predicted entity-candidate matrix to receive the various candidates for the reference entities. For example, the predictive data analysis computing entity 106 may request the candidates for User 2, User 11, and User 19. In response, the predictive data analysis computing entity 106 will have the following candidates and ratings: (1) User 2—Choice Plus: 3.0, OCI: 4.97, Navigate: 4.20, Core: 2.28, NexusACO: 0.86, Select Plus: 1.3, Charter: 0.90; User 11—Choice Plus: 0.06, OCI: 4.59, Navigate: 3.45, Core: 3.42, NexusACO: 3.49, Select Plus: 1.97, Charter: 2.3; User 19—Choice Plus: 2.07, OCI: 3.85, Navigate: 1.13, Core: 0.73, NexusACO: 1.8, Select Plus: 5.40, Charter: 2.32.

Based on the candidates and ratings (initial ratings and model-predicted ratings associated with the qualifying reference entity representation subset), the predictive data analysis computing entity 106 can use any number of the candidates based on the ratings as predicted recommendations. In one example, one candidate for each reference entity is used as part of the predicted recommendation. For instance, the highest or lowest rated candidate for a given reference entity is used. Alternatively, the highest or lowed rated candidate among all of the reference entities is used. In another example, multiple candidates for each reference entity are used as part of the predicted recommendation. For instance, the two or three highest or lowest rated candidates for a given reference entity are used. Alternatively, the two or three highest or lowest rated candidates among all of the reference entities are used. And in yet another example, candidates satisfying a candidate rating threshold are used as part of the predicted recommendation. For instance, candidates for a given reference entity are used provided they satisfy the candidate rating threshold. Alternatively, the two or three highest or lowest rated candidates among all the reference entities are used provided they satisfy the candidate rating threshold. The predictive data analysis computing entity 106 then use the selected candidates as part of the predicted recommendation, which can be provided as a predicted recommendation data object.

At step/operation 505 of FIG. 5A, the predictive data analysis computing entity 106 initiates the performance of one or more prediction-based actions based on the predicted recommendation. As will be recognized, prediction-based actions may include a variety of actions. For example, a prediction based action may be generating a user interface with a presentation comprising the recommendation that depicts one or more candidates as recommendations for the input entity. FIG. 7 depicts an example recommendation user interface 700. As shown in FIG. 7, the recommendation user interface 700 may depict the one or more candidates 702 recommended for the input entity representation. As further depicted in FIG. 7, in some embodiments, the user interface may depict the combination one or more entity representation features 704 for the input entity representation.

Other examples of prediction-based actions may include automated recommendation notifications, automated appointment scheduling, automated implementation of precautionary actions, automated hospital preparation actions, automated workforce management operational management actions, automated server load balancing actions, automated call center preparation actions, automated insurance plan pricing actions, automated insurance plan update actions, and/or the like. As will be recognized a variety of other approaches and techniques can be used to adapt to various needs and circumstances. With these approaches and techniques, the disclosure provides for an effective and computationally efficient framework that addresses the unique needs and challenges of sparse, highly dimensional domains.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

initiating, by one or more processors, the performance of one or more prediction-based actions, wherein the one or more prediction-based actions comprise generating a user interface that provides a predicted recommendation to a client computing device, wherein the predicted recommendation is generated by:

generating an input entity representation based at least in part on one or more entity representation features, wherein the input entity representation comprises an entity representation feature value for each entity representation feature; and generating, using a collaborative filtering machine learning model, the predicted recommendation based at least in part on the input entity representation, wherein:

(i) the collaborative filtering machine learning model is trained based at least in part on an initialization dataset, wherein:

(a) the initialization dataset is representative of an initial entity-candidate matrix comprising a plurality of rating data fields, and (b) each rating data field is associated with a unique pair of a reference entity representation and a candidate, (ii) each data field of a first set of the plurality of rating data fields in the initial entity-candidate matrix comprises an initial rating, (iii) each data field of a second set of the plurality of rating data fields in the initial entity-candidate matrix comprises a null value, (iv) the collaborative filtering machine learning model generates a model-predicted rating for each data field of the second set, (v) a model-predicted entity-candidate matrix is generated, wherein:

(a) the model-predicted entity-candidate matrix comprises the initial rating and the model-predicted rating, and (b) the model-predicted entity-candidate matrix is represented as a model-predicted dataset, and (vi) the collaborative filtering machine learning model has been further is trained based at least in part on the model-predicted dataset by:

(a) determining, for the reference entity representation, an entity representation latent feature and a candidate latent feature, (b) generating, based at least in part on the initial rating, (1) an entity representation prediction value for the entity representation latent feature, and (2) a candidate prediction value for the candidate latent feature, (c) generating, based at least in part on the entity representation prediction value, a reference entity representation embedding for the reference entity representation, and (d) generating, based at least in part on the candidate prediction value, a candidate embedding for the candidate; and providing, by the one or more processors and via the user interface, a display of an automated recommendation notification based at least in part on the predicted recommendation.

2. The computer-implemented method of claim 1 further comprising:

determining a qualifying reference entity representation subset comprising one or more reference entity representations, wherein each reference entity representation of the qualifying reference entity representation subset is associated with a similarity measure satisfying a similarity threshold; and selecting a reference candidate that corresponds to the reference entity representation of the qualifying reference entity representation subset to include as part of the predicted recommendation.

3. The computer-implemented method of claim 2, wherein the candidate is ranked based at least in part on a respective initial rating or a respective model-predicted rating.

4. The computer-implemented method of claim 1 further comprising:

determining a qualifying reference entity representation subset comprising one or more reference entity representations, wherein each reference entity representation of the qualifying reference entity representation subset is associated with a similarity measure satisfying a similarity threshold; and selecting the reference entity representation from the qualifying reference entity representation subset to include as part of the predicted recommendation, wherein a respective initial rating or a respective model-predicted rating for the candidate satisfies a candidate rating threshold.

5. The computer-implemented method of claim 4, wherein the candidate is ranked based at least in part on the respective initial rating or the respective model-predicted rating.

6. The computer-implemented method of claim 1, wherein the model-predicted entity-candidate matrix is generated based at least in part on the reference entity representation embedding for the reference entity representation and the candidate embedding for the candidate.

7. The computer-implemented method of claim 1, wherein the initialization dataset is generated from historical data extracted from one or more document data objects.

8. A system comprising one or more processors and one or more non-transitory computer readable media storing processor-executable instructions that, when executed by the one or more processors, cause the one or more processors to perform operations comprising:

initiating the performance of one or more prediction-based actions, wherein the one or more prediction-based actions comprise generating a user interface that provides a predicted recommendation to a client computing device, wherein the predicted recommendation is generated by:

generating an input entity representation based at least in part on one or more entity representation features, wherein the input entity representation comprises an entity representation feature value for each entity representation feature; and generating, using a collaborative filtering machine learning model, the predicted recommendation based at least in part on the input entity representation, wherein:

(i) the collaborative filtering machine learning model has been is trained based at least in part on an initialization dataset, wherein:

(a) the initialization dataset is representative of an initial entity-candidate matrix comprising a plurality of rating data fields, and (b) each rating data field is associated with a unique pair of a reference entity representation and a candidate, (ii) each data field of a first set of the plurality of rating data fields in the initial entity-candidate matrix comprises an initial rating, (iii) each data field of a second set of the plurality of rating data fields in the initial entity-candidate matrix comprises a null value, (iv) the collaborative filtering machine learning model generates a model-predicted rating for each data field of the second set, (v) a model-predicted entity-candidate matrix is generated, wherein:

(a) the model-predicted entity-candidate matrix comprises the initial rating and the model-predicted rating, and (b) the model-predicted entity-candidate matrix is represented as a model-predicted dataset, and (vi) the collaborative filtering machine learning model has been further is trained based at least in part on the model-predicted dataset by:

(a) determining, for the reference entity representation, an entity representation latent feature and a candidate latent feature, (b) generating, based at least in part on the initial rating, (1) an entity representation prediction value for the entity representation latent feature, and (2) a candidate prediction value for the candidate latent feature, (c) generating, based at least in part on the entity representation prediction value, a reference entity representation embedding for the reference entity representation, and (d) generating, based at least in part on the candidate prediction value, a candidate embedding for the candidate; and providing, via the user interface, a display of an automated recommendation notification based at least in part on the predicted recommendation.

9. The system of claim 8, wherein the operations further comprise:

determining a qualifying reference entity representation subset comprising one or more reference entity representations, wherein each reference entity representation of the qualifying reference entity representation subset is associated with a similarity measure satisfying a similarity threshold; and selecting a reference candidate that corresponds to the reference entity representation of the qualifying reference entity representation subset to include as part of the predicted recommendation.

10. The system of claim 9, wherein the candidate is ranked based at least in part on a respective initial rating or a respective model-predicted rating.

11. The system of claim 8, wherein the operations further comprise:

determining a qualifying reference entity representation subset comprising one or more reference entity representations, wherein each reference entity representation of the qualifying reference entity representation subset is associated with a similarity measure satisfying a similarity threshold; and selecting the reference entity representation from the qualifying reference entity representation subset to include as part of the predicted recommendation, wherein a respective initial rating or a respective model-predicted rating for the candidate satisfies a candidate rating threshold.

12. The system of claim 11, wherein the candidate is ranked based at least in part on the respective initial rating or the respective model-predicted rating.

13. The system of claim 8, wherein the model-predicted entity-candidate matrix is generated based at least in part on the reference entity representation embedding for the reference entity representation and the candidate embedding for the candidate.

14. The system of claim 8, wherein the initialization dataset is generated from historical data extracted from one or more document data objects.

15. One or more non-transitory computer-readable storage media storing instructions that, when executed by one or more processors, cause the one or more processors to perform operations comprising:

initiating the performance of one or more prediction-based actions, wherein the one or more prediction-based actions comprise generating a user interface that provides a predicted recommendation to a client computing device, wherein the predicted recommendation is generated by:

generating an input entity representation based at least in part on one or more entity representation features, wherein the input entity representation comprises an entity representation feature value for each entity representation feature; and generating, using a collaborative filtering machine learning model, the predicted recommendation based at least in part on the input entity representation, wherein:

(i) the collaborative filtering machine learning model is trained based at least in part on an initialization dataset, wherein:

(a) the initialization dataset is representative of an initial entity-candidate matrix comprising a plurality of rating data fields, and (b) each rating data field is associated with a unique pair of a reference entity representation and a candidate, (ii) each data field of a first set of the plurality of rating data fields in the initial entity-candidate matrix comprises an initial rating, (iii) each data field of a second set of the plurality of rating data fields in the initial entity-candidate matrix comprises a null value, (iv) the collaborative filtering machine learning model generates a model-predicted rating for each data field of the second set, (v) a model-predicted entity-candidate matrix is generated, wherein:

(a) the model-predicted entity-candidate matrix comprises the initial rating and the model-predicted rating, and (b) the model-predicted entity-candidate matrix is represented as a model-predicted dataset, and (vi) the collaborative filtering machine learning model is trained based at least in part on the model-predicted dataset by:

(a) determining, for the reference entity representation, an entity representation latent feature and a candidate latent feature, (b) generating, based at least in part on the initial rating, (1) an entity representation prediction value for the entity representation latent feature, and (2) a candidate prediction value for the candidate latent feature, (c) generating, based at least in part on the entity representation prediction value, a reference entity representation embedding for the reference entity representation, and (d) generating, based at least in part on the candidate prediction value, a candidate embedding for the candidate; and providing, via the user interface, a display of an automated recommendation notification based at least in part on the predicted recommendation.

16. The one or more non-transitory computer-readable storage media of claim 15 wherein the operations further comprise:

determining a qualifying reference entity representation subset comprising one or more reference entity representations, wherein each reference entity representation of the qualifying reference entity representation subset is associated with a similarity measure satisfying a similarity threshold; and selecting a reference candidate that corresponds to the reference entity representation of the qualifying reference entity representation subset to include as part of the predicted recommendation.

17. The one or more non-transitory computer-readable storage media of claim 16, wherein the candidate is ranked based at least in part on a respective initial rating or a respective model-predicted rating.

18. The one or more non-transitory computer-readable storage media of claim 15 wherein the operations further comprise:

determining a qualifying reference entity representation subset comprising one or more reference entity representations, wherein each reference entity representation of the qualifying reference entity representation subset is associated with a similarity measure satisfying a similarity threshold; and selecting the reference entity representation from the qualifying reference entity representation subset to include as part of the predicted recommendation, wherein a respective initial rating or a respective model-predicted rating for the candidate satisfies a candidate rating threshold.

19. The one or more non-transitory computer-readable storage media of claim 18, wherein the model-predicted entity-candidate matrix is generated based at least in part on the reference entity representation embedding for the reference entity representation and the candidate embedding for the candidate.

20. The one or more non-transitory computer-readable storage media of claim 15, wherein the initialization dataset is generated from historical data extracted from one or more document data objects.

* * * * *